(12) United States Patent
McCormick et al.

(10) Patent No.: US 8,255,829 B1
(45) Date of Patent: Aug. 28, 2012

(54) DETERMINING SYSTEM LEVEL INFORMATION TECHNOLOGY SECURITY REQUIREMENTS

(75) Inventors: Margaret McCormick, Kansas City, MO (US); Jeff Meaux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 437 days.

(21) Appl. No.: 12/544,206

(22) Filed: Aug. 19, 2009

(51) Int. Cl.
*G06F 3/048* (2006.01)
*G06Q 10/00* (2012.01)

(52) U.S. Cl. ............ 715/810; 715/741; 715/968; 726/3; 705/7.11; 705/7.12; 705/7.13

(58) Field of Classification Search .................. 715/741, 715/810, 968; 726/3; 705/7.11, 7.12, 7.13
See application file for complete search history.

(56) References Cited

U.S. PATENT DOCUMENTS

| | | | | |
|---|---|---|---|---|
| 6,081,805 | A * | 6/2000 | Guha | 1/1 |
| 7,757,121 | B1 * | 7/2010 | Perron et al. | 714/26 |
| 2002/0184068 | A1 * | 12/2002 | Krishnan et al. | 705/8 |
| 2004/0102922 | A1 * | 5/2004 | Tracy et al. | 702/181 |
| 2005/0132188 | A1 * | 6/2005 | Khin et al. | 713/166 |
| 2007/0050449 | A1 * | 3/2007 | Beck | 709/204 |
| 2009/0259677 | A1 * | 10/2009 | Levine et al. | 707/102 |

OTHER PUBLICATIONS

"United States Postal Service Login Page", Sep. 8, 2005, retreived Dec. 8, 2011 from Wayback Machine, http://web.archive.org/web/20050908185045/https://ecap21.usps.com/cgi-bin/ecapbv/scripts/login.jsp.*

"Project Management: A Systems Approach to Planning, Scheduling, and Controlling.", New York, N.Y., John Wiley & Sons, 2001, 7th Edition, p. 83.

* cited by examiner

*Primary Examiner* — Kieu Vu
*Assistant Examiner* — Aaron Lowenberger

(57) ABSTRACT

Systems and methods provide system level information technology security requirements. A requirements component outputs prompts via a user interface, including questions regarding a type of data associated with a project application, how the project application authenticates and authorizes users, a processing and storage characterization of the project application and corresponding sets of selectable responses. The component receives selections of at least one of each set of selectable responses, identifies a set of security requirements for the project application based on the selections, and outputs the set of security requirements via the user interface to assist an application team in developing the project application. The component may identify a security test associated with at least one of the set of security requirements, and output the identification of the security test. The component may output information associated with a corresponding set of security requirements in response to receiving an audit request.

20 Claims, 4 Drawing Sheets

200

| # 202 | Question 204 | | Select 206 | Answer 208 |
|---|---|---|---|---|
| 1 | What type of data is associated with the project application? Check all that apply. | | | |
| | | | A | Public |
| | | | B | Restricted-CPNI |
| | | | C | Restricted - Government |
| | | | D | Restricted – HIPAA |
| | | | E | Restricted-PCI |
| | | | F | Restricted – PII |
| | | | G | Restricted – SOX |
| | | | H | Restricted – Other |
| 2 | Who handles/will handle the data classified as Restricted that is associated with the project application? Check all that apply. | | | |
| | | | A | Enterprise Employees |
| | | | B | Contractors |
| | | | C | Citizens |
| | | | D | Non-Citizens |
| | | | E | Offshore |
| 3 | Does the application send or receive data files classified as Restricted, outside the Enterprise Network? Choose one. | | | |
| | | | A | No, neither. |
| | | | B | Yes, both. |
| | | | C | Yes, it sends data. |
| | | | D | Yes, it receives data. |
| 4 | How does the project application authorize and authenticate? Choose one. | | | |
| | | | A | Not needed. |
| | | | B | Enterprise-scale web access management system |
| | | | C | Active domain identification |
| | | | D | Both |
| 5 | Which description best characterizes the project application? Choose one. | | | |
| | | | A | Thin client. |
| | | | B | Fat client. |
| | | | C | Back end batch processing application |
| | | | D | None of the above. |

200

| # 202 | Question 204 | Select 206 | Answer 208 |
|---|---|---|---|
| 1 | What type of data is associated with the project application? Check all that apply. | | |
| | | A | Public |
| | | B | Restricted-CPNI |
| | | C | Restricted - Government |
| | | D | Restricted – HIPAA |
| | | E | Restricted-PCI |
| | | F | Restricted – PII |
| | | G | Restricted – SOX |
| | | H | Restricted – Other |
| 2 | Who handles/will handle the data classified as Restricted that is associated with the project application? Check all that apply. | | |
| | | A | Enterprise Employees |
| | | B | Contractors |
| | | C | Citizens |
| | | D | Non-Citizens |
| | | E | Offshore |
| 3 | Does the application send or receive data files classified as Restricted, outside the Enterprise Network? Choose one. | | |
| | | A | No, neither. |
| | | B | Yes, both. |
| | | C | Yes, it sends data. |
| | | D | Yes, it receives data. |
| 4 | How does the project application authorize and authenticate? Choose one. | | |
| | | A | Not needed. |
| | | B | Enterprise-scale web access management system |
| | | C | Active domain identification |
| | | D | Both |
| 5 | Which description best characterizes the project application? Choose one. | | |
| | | A | Thin client. |
| | | B | Fat client. |
| | | C | Back end batch processing application |
| | | D | None of the above. |

Fig. 2

DETERMINING SYSTEM LEVEL INFORMATION TECHNOLOGY SECURITY REQUIREMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A development project is a temporary endeavor undertaken to develop a new product or service. An enterprise may use a project development pipeline to organize and optimize the allocation of resources for a stream of development projects. Such resources may include time, money, people, materials, energy, space, equipment, communication, quality assurance, and risk tolerance. A development pipeline consists of a chain of processes and resources arranged so that the output of each element of the chain flows into the input of the next element in the development pipeline.

SUMMARY

In some embodiments, a system is provided for system level information technology security requirements. The system includes a processor, a memory, and a requirements component stored in the memory. When executed by the processor, the requirements component outputs three prompts via a user interface. The first prompt includes a question regarding a type of data associated with a project application and a first set of selectable responses. The second prompt includes a question regarding how the project application authenticates and authorizes users and a second set of selectable responses. The third prompt includes a question regarding a processing and storage characterization of the project application and a third set of selectable responses. The requirements component receives selections of at least one of the first set of selectable responses, at least one of the second set of selectable responses, and at least one of the third set of selectable responses via the user interface. The requirements component identifies a set of security requirements for the project application based on the selections and outputs the set of security requirements via the user interface to assist an application team in developing the project application.

In some embodiments, a method is provided for system level information technology security requirements. A requirements component, stored in a memory and executed by a processor, outputs three prompts via a user interface. The first prompt includes a question regarding a type of data associated with a project application and a first set of selectable responses. The second prompt includes a question regarding how the project application authenticates and authorizes users and a second set of selectable responses. The third prompt includes a question regarding a processing and storage characterization of the project application and a third set of selectable responses. The requirements component receives selections of at least one of the first set of selectable responses, at least one of the second set of selectable responses, and at least one of the third set of selectable responses via the user interface. The requirements component identifies a set of security requirements for the project application based on the selections, and outputs the set of security requirements via the user interface to assist an application team in developing the project application. The requirements component identifies a security test associated with at least one of the set of security requirements, and outputs the identification of the security test via the user interface to enable testing of compliance with the set of security requirements.

In some embodiments, a system is provided for system level information technology security requirements. The system includes a processor, a memory, and a requirements component stored in the memory. When executed by the processor, the requirements component outputs three prompts via a user interface for each of multiple project applications. The first prompt includes a question regarding a type of data associated with a corresponding project application and a first set of selectable responses. The second prompt includes a question regarding how the corresponding project application authenticates and authorizes users and a second set of selectable responses. The third prompt includes a question regarding a processing and storage characterization of the corresponding project application and a third set of selectable responses. The requirements component receives selections of at least one of the first set of selectable responses, at least one of the second set of selectable responses, and at least one of the third set of selectable responses for each of the multiple project applications. The requirements component identifies a corresponding set of security requirements for each of the multiple project applications based on the selections. The requirements component stores the corresponding set of security requirements for each of the multiple project applications in a database. The requirements component outputs the corresponding set of security requirements via the user interface to assist a corresponding application team in developing each of the multiple project applications. The requirements component receives an audit request via the user interface, identifies a set of project applications based on the audit request, identifies a corresponding set of security requirements in the database for each of the identified set of project applications, and outputs information associated with the corresponding set of security requirements for each of the identified set of project applications. The information includes the corresponding set of security requirements for each of the identified set of project applications.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 shows a frame of a graphic user interface for system level information technology security requirements according to some embodiments of the present disclosure.

DETAILED DESCRIPTION

Figure 1:
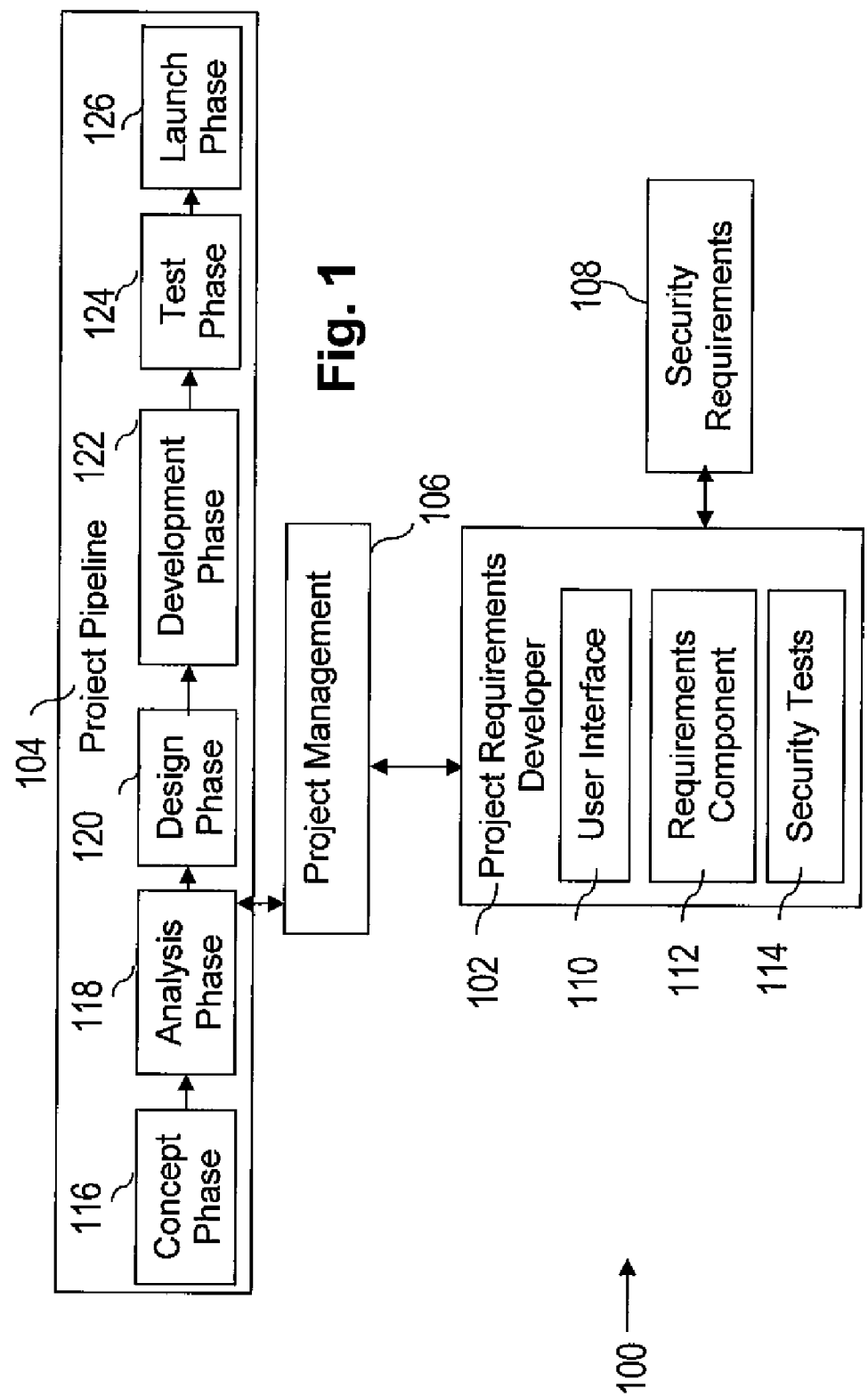
FIG. 1 shows a system for system level information technology security requirements according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A security representative may be assigned to assist an application development team in developing or modifying an application for a project to meet specific business needs in a secure manner. An application is computer software that employs the capabilities of a computer to perform a task for a computer user. A project application may be assigned a set of security requirements that are designed to protect data from corruption and/or theft when the data is stored and/or in transit. However, the security representative may often give the application development team a long list of hundreds of security requirements and expect the application development team to understand which security requirements apply to their project at its current stage of development and to be able to properly apply the correct security requirements to their project application. For example, the security representative may aggregate all security requirements from a number of different projects, provide this comprehensive set of security requirements to the application development team, and leave the responsibility to the application development team to determine which of these security requirements apply to their project and which do not apply. Project managers and application development teams may exclude security requirements from a project application's development due to inability to properly identify the correct security requirements from the long list of security requirements and the inability to decipher the security requirements identified for the project application. Consequently, application development teams may develop non-secure project applications. Subsequent security failures or audits may reveal the failure to implement appropriate security requirements during the development of project applications.

In some embodiments, methods and systems are provided for system level information technology security requirements. A requirements component outputs three prompts via a user interface. The first prompt includes a question regarding the type of data associated with a project application and a first set of selectable responses. The second prompt includes a question regarding how the project application authenticates and authorizes users and a second set of selectable responses. The third prompt includes a question regarding a processing and storage characterization of the project application and a third set of selectable responses. A user selects at least one of the first set of selectable responses, at least one of the second set of selectable responses, and at least one of the third set of selectable responses via the user interface, and the requirements component receives these selections. For example, the selected responses to the three prompts indicates that a project application is associated with public data, a web access management system authorizes and authenticates access to the project application, and the project application is a back end batch processing application. In another example, the selected responses to the three prompts indicates that a project application is associated with restricted government data, either a web access management system or an active domain identification system authorizes and authenticates access to the project application, and the project application is a thin client.

The requirements component identifies a set of security requirements for the project application based on the selections. For example, the requirements component identifies two security requirements for the back end project application. In another example, the requirements component identifies one hundred security requirements for the thin client project application. The requirements component outputs the set of security requirements via the user interface to assist an application team in developing the project application. For example, the requirements component outputs understandable system requirements that correspond to the two security requirements to assist the application team in developing the back end project application. In another example, the requirements component outputs understandable system requirements that correspond to the one hundred security requirements to assist the application team in developing the thin client project application.

Instead of requiring project managers or application development teams to sort through hundreds of security requirements, the requirements component identifies the applicable security requirements for a project application based on twenty-five potential multiple choice answers to three questions. In contrast to requiring project managers or application development teams to decipher ambiguous security requirements for their project application, the requirements manager outputs understandable system requirements that correspond to the identified security requirements that enable the application development team to more easily incorporate the security requirements into the development of their project application. The requirements component enables application development teams to develop project applications that meet their security requirements, execute securely, and pass both security tests and audits of security requirements. In some embodiments, only these three questions are asked, while in other embodiments follow-up questions in related areas or supporting an additional few requirements could be used. The system automatically generates the complex response based on this much more limited, but easily understandable, set of key inputs. In some embodiments, over 90 percent of all the requirements are determined by these three questions.

FIG. 1 shows an illustrative system 100 for developing projects. The system 100 includes a project requirements developer 102, a project pipeline 104, project management 106, and security requirements 108.

The project requirements developer 102 includes a user interface 110, a requirements component 112, and security tests 114. Although in some embodiments the project requirements developer 102 is implemented as one or more applications that execute on a computer system to automatically take certain actions or process certain data, in other embodiments these actions or activities may be accomplished manually, such as by a user evaluating a paper list, or a spreadsheet template, of project requirements. In other embodiments, these actions may be accomplished partially by hand and partially by the computer.

The project pipeline 104 may include a concept phase 116, an analysis phase 118, a design phase 120, a development phase 122, a test phase 124, and a launch phase 126. In other embodiments, however, the project pipeline 104 may include additional phases and/or combine some of the phases listed separately above.

The project management 106 may include application stakeholders, such as project concept initiators, application analysts, application designers, application developers, project testers, project sponsors, application development teams, security representatives, and project representatives. The project management 106 may also include pipeline managers who are responsible for managing the project pipeline 104 and requirements managers who assist in identifying and determining the security requirements 108 for each project.

The security requirements 108 may be selected from a repeatable requirements database that lists proposed security requirements for project applications. Examples of hundreds of security requirements 108 are included in the attached appendix. Although FIG. 1 depicts various numbers and types of system elements 102-126, the system 100 may include any number and type of system elements 102-126.

While a project is flowing through the phases 116-126 of the project pipeline 104, any member of the project management 106, such as a project manager or a pipeline manager, may use the project requirements developer 102 to develop the security requirements 108 for a project application. Although this example depicts the project requirements developer 102 developing the security requirements 108 during the analysis phase 118, the project requirements developer 102 may develop the security requirements 108 during any and/or all of the phases 116-126. The phases 116-126 are depicted for the purpose of an illustrative example, as the development process of the project pipeline 104 may include any number and type of phases. For example, a general definition of a development process includes a conceptual phase, a planning phase, a definition and design phase, an implementation phase, and a conversion phase. Different types of projects that employ a development process can include engineering projects, manufacturing projects, computer programming projects, and construction projects. For example, the development process for an engineering project can include a start-up phase, a definition phase, a main phase, and a termination phase. Examples of different project phases for different types of projects can be found in Kerzner, Harold, *Project Management: A Systems Approach to Planning, Scheduling, and Controlling*. New York, N.Y., John Wiley & Sons, 2001, 7$^{th}$ Edition. p. 83. HD69.P75 K47 2000.

The requirements component 112 outputs three prompts via the user interface 110. The first prompt includes a question regarding a type of data associated with a project application and a first set of selectable responses. Examples of the first set of selectable responses are described below in reference to FIG. 2. By answering the first prompt, a user of the system 100 specifies whether the data for the project application is public data that calls for limited security requirements or restricted data that calls for stricter security requirements. The second prompt includes a question regarding how the project application authenticates and authorizes users and a second set of selectable responses. Examples of the second set of selectable responses are described below in reference to FIG. 2. By answering the second prompt, a user of the system 100 specifies how the project application is designed to implement some potential security requirements. The third prompt includes a question regarding a processing and storage characterization of the project application and a third set of selectable responses. Examples of the third set of selectable responses are described below in reference to FIG. 2. By answering the third prompt, a user of the system 100 specifies where the project application is designed to process and store data that may be restricted data with higher security requirements.

The requirements component 112 receives selections of at least one of the first set of selectable responses, at least one of the second set of selectable responses, and at least one of the third set of selectable responses via the user interface 110. For example, the selected responses to the three prompts indicate that a project application is associated with public data, a web access management system authorizes and authenticates access to the project application, and the project application is a back end batch processing application. In another example, the selected responses to the three prompts indicate that a project application is associated with restricted government data, either a web access management system or an active domain identification system authorizes and authenticates access to the project application, and the project application is a thin client.

The requirements component 112 identifies a set of security requirements for the project application based on the selections. For example, the requirements component 112 identifies two security requirements for the back end project application. In another example, the requirements component 112 identifies one hundred security requirements for the project application.

The requirements component 112 outputs the set of security requirements via the user interface 110 to assist an application team in developing the project application. For example, the requirements component 112 outputs understandable system requirements that correspond to the two security requirements to assist the application team in developing the back end project application. In another example, the requirements component 112 outputs understandable system requirements that correspond to the one hundred security requirements to assist the application team in developing the thin client project application.

Each of the hundreds of security requirements may correspond to a system requirement that specifies an action for the application team. For example, the security requirement, "The ability for all recorded events to include the system date," corresponds to the system requirement, "The <xyz application log for XYZ application> shall include the following data elements for each logged or recorded event: system date, time of event, User id, IP address or computer name, success or failure of the event." By outputting the more detailed implementation action associated with the corresponding system requirements, the requirements component 112 enables the application team to more readily understand the corresponding security requirements and the implications for incorporating them into the project. This enhanced understanding enables the application team to more effectively implement the security requirements for the project application.

The requirements component 112 may eliminate duplicate system requirements before outputting the system requirements that correspond to the identified security requirements via the user interface 110. For example, many of the one hundred security requirements for the thin client project application correspond to the same specific actions specified by the corresponding system requirements. Continuing this example, the requirements component 112 eliminates the duplicate system requirements, such that the user interface 110 displays significantly less than one hundred actions for the application development team to take to satisfy the identified one hundred security requirements.

The requirements component 112 may identify a security test associated with at least one of the set of security requirements. For example, the requirements component 112 identifies one of the security tests 114 to test that the two security requirements have been properly implemented for the back end project application. The requirements component 112 may output the identification of the security test via the user interface 110 to enable testing of compliance with the set of security requirements. For example, the requirements component 112 outputs the identification of the security test for the back end project application, which enables the project management 106 to execute the security test to verify that the back end project application has been developed in compliance with the two security requirements. Additionally, the requirements component 112 may execute the security test and output a result of executing the security test via the user interface 110 to report compliance with the set of security requirements. For example, the requirements component 112 executes the security test for the back end test application automatically without the need for human intervention. In addition to identifying the correct security requirements for a project application, the requirements component 112 may also identify corresponding security tests that may be executed to verify that development of the project application satisfies its security requirements.

The requirements component 112 may store the corresponding set of security requirements for each of multiple project applications in a database. For example, the requirements component 112 stores the two security requirements for the back end project application and the one hundred security requirements for the thin client project application in a database. The requirements component 112 may receive an audit request via the user interface 110 and identify a set of project applications based on the audit request. For example, the requirements component 112 identifies the back end project application and the thin client project application based on the audit request. The requirements component 112 may identify a corresponding set of security requirements in the database for each of the identified set of project applications. For example, the requirements component 112 identifies the two security requirements for the back end project application and the one hundred security requirements for the thin client project application. The requirements component 112 may output information associated with the corresponding set of security requirements for each of the identified set of project applications, wherein the information includes the corresponding set of security requirements for each of the identified set of project applications. For example, the requirements component 112 outputs the two security requirements for the back end project application and the one hundred security requirements for the thin client project application via the user interface 110. The information may include information associated with at least one security test executed for each of the identified set of project applications and a corresponding result associated with executing each security test. For example, the requirements component 112 outputs information that identifies the security test for the back end project application and the security test for the thin client project application and the results of executing each of these security tests. In addition to identifying the correct security requirements for a project application and the corresponding security tests that may be executed to verify that development of the project application satisfies its security requirements, the requirements component 112 may also enable audits to identify applications, their security requirements, their security tests, and the results of their security tests.

Turning now to FIG. 2, a frame 200 of a graphic user interface for system level information technology security requirements is depicted according to an embodiment of the present disclosure. The frame 200 includes columns for question numbers 202, questions 204, selections 206, and answers 208. The requirements component 112 may initially output question number 1 regarding a type of data associated with a project application, question number 4 regarding how the project application authenticates and authorizes users, question number 5 regarding a processing and storage characterization of the project application, and their corresponding sets of selectable responses via the user interface 110.

If a user of the system 100 selects only selection A, public data, from the first set of selectable responses, the requirements component 112 may need to output only questions 4 and 5 to determine the security requirements for the project application because the project application does not use restricted data. If the user selects any of the selectable responses corresponding to restricted data from the first set of selectable responses, the requirements component 112 may output question number 2 regarding an identity of those who handle data classified as restricted that is associated with the project application, output question number 3 regarding whether the project application sends and/or receives data classified as restricted outside an enterprise network, and output their corresponding sets of selectable responses via the user interface 110. Although question number 1, question number 2, and question number 3 are described as three questions, question number 2 and question number 3 are actually sub-questions for question number 1 that are only presented in response to certain selectable responses to question number 1. Furthermore, the requirements component 112 may output the multiple choice questions numbered 1, 4, and 5 in any order and output questions numbered 2 and 3 in any order following certain selectable responses to question number 1.

Although the requirements component 112 may not select any of the security requirements based on selected responses to questions number 2 and 3, the requirements component 112 may modify implementation of the set of security requirements for the project application based on a selection in response to questions number 2 and 3. For example, the selection of selectable response 1C, restricted government data, from the first set of selectable responses results in the requirements component 112 selecting the security requirement "The ability to restrict employee owned systems from storing or processing any information defined by the Government as Sensitive but Unclassified or Classified." This security requirement corresponds to the system requirement "<The application team> shall not store data, defined by the Government as Sensitive but Unclassified or Classified, on personally owned computers." The selection of selectable response 2D, non-citizens, may result in the requirements component 112 modifying this system requirement to take into account any additional actions required to ensure that non-citizens do not access the restricted government data.

The first prompt includes a question regarding a type of data associated with a project application and a first set of selectable responses. The first set of selectable responses include responses associated with public data, restricted customer proprietary network information (CPNI) data, restricted government data, restricted health insurance portability and accountability act (HIPAA) data, restricted payment card industry (PCI) data, restricted private identifiable information (PII) data, and restricted Sarbanes-Oxley Act of 2002 (SOX) data.

In response to any selection of restricted data from the first set of selectable responses, the requirements component 112 outputs a second prompt via the user interface 110 that includes a question regarding an identity of those who handle data classified as restricted that is associated with the project application and a second set of selectable responses. The second set of selectable responses includes responses associated with enterprise employees, contractors, citizens, non-citizens, and offshore workers. The requirements component 112 modifies implementation of the set of security requirements for the project application based on selections in response to question number 2.

In response to any selection of restricted data from the first set of selectable responses, the requirements component 112 outputs a third prompt via the user interface 110 that includes a question whether the project application sends and/or receives data classified as restricted outside an enterprise network and a third set of selectable responses. The third set of selectable responses include responses associated with sending data outside the enterprise network, receiving data from outside the enterprise network, both sending data outside the enterprise network and receiving data from outside the enterprise network, and sending data only inside the enterprise network and receiving data only from inside the enterprise network. The requirements component 112 modifies implementation of the set of security requirements for the project application based on selections in response to question number 2.

If a user of the system 100 selects only selection A, public data, from the first set of selectable responses, the requirements component 112 may need to output only questions 4 and 5 to determine the security requirements for the project application because the project application does not use restricted data. The fourth prompt includes a question regarding how the project application authenticates and authorizes users and a fourth set of selectable responses. The fourth set of selectable responses includes responses associated with an enterprise-scale web access management system, an active domain identification system, a combination of the enterprise-scale web access management system and the active domain identification system, and a system without the enterprise-scale web access management system and the active domain identification system.

The fifth prompt includes a question regarding a processing and storage characterization of the project application and a fifth set of selectable responses. The fifth set of selectable responses includes responses associated with a thin client, a fat client, and a back end batch processing application.

The appendix attached depicts an example of mappings from selected responses to questions number 1, 4, and 5 to exemplary security requirements for application teams. Some of the security requirements depicted in the appendix are not associated with any selected responses to questions number 1, 4, and 5 because these security requirements are identified for implementation by network teams, corporate security teams, firewall teams, and system administration teams, but not for implementation by application development teams. The requirements component 112 identifies at least one of the set of security requirements for the project application based on combining at least two of the selections. For example, the security requirement "The ability to exempt eCommerce systems from implementing password history standards," is selected by the requirements component 112 when a user of the system 100 selects the responses 1B, restricted CPNI data, and 5A, thin client. Selections of other security requirements based on combinations of selections from the sets of selectable responses are depicted in the appendix.

Instead of requiring project managers or application development teams to sort through hundreds of security requirements, the requirements component 112 identifies the applicable security requirements for a project application based on sixteen potential multiple choice answers to effectively three questions. In contrast to requiring project managers or application development teams to decipher ambiguous security requirements for their project application, the requirements manager 112 outputs understandable system requirements that correspond to the identified security requirements that enable the application development team to more easily incorporate the security requirements into the development of their project application. The requirements component 112 enables application development teams to develop project applications that meet their security requirements, execute securely, and pass both security tests and audits of security requirements.

Figure 3:
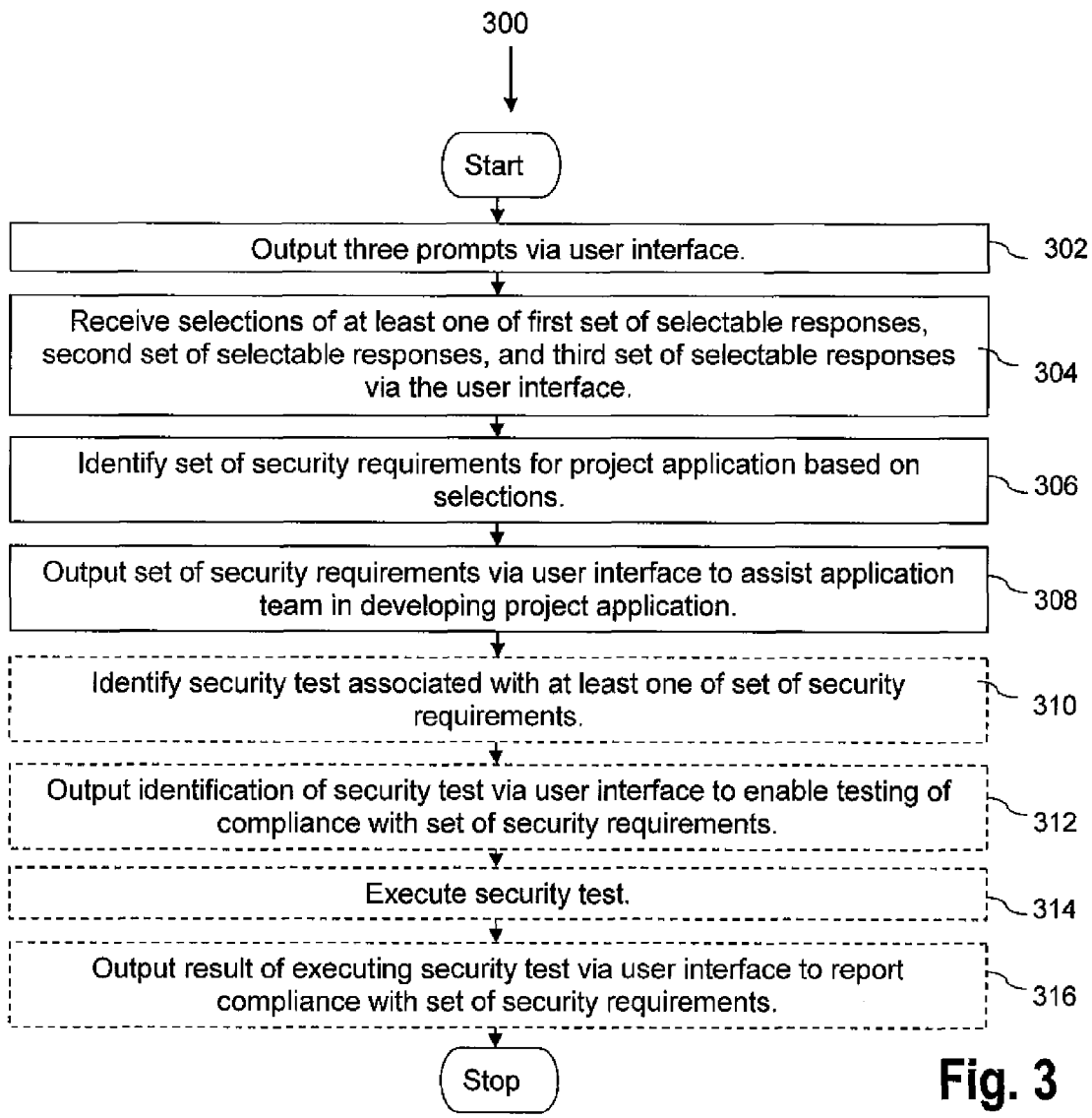
FIG. 3 shows a method for system level information technology security requirements according to some embodiments of the present disclosure.

Turning now to FIG. 3, a method 300 for system level information technology security requirements is depicted according to an embodiment of the present disclosure. Executing the method 300 enables the project management 106 to identify security requirements for a project application.

In box 302, three prompts are output via a user interface. For example, the requirements component 112 outputs questions number 1, 4, and 5 depicted in the frame 200.

In box 304, selections are received of at least one of each of a first set of selectable responses, a second set of selectable responses, and a third set of selectable responses via the user interface. For example, the requirements component 112 receives the selected responses to questions number 1, 4, and 5 that indicate that a project application is associated with public data, a web access management system authorizes and authenticates access to the project application, and the project application is a back end batch processing application In box 306, a set of security requirements for a project application is identified based on selections. For example, the requirements component 112 identifies two security requirements for the back end project application based on the selections.

In box 308, a set of security requirements is output via a user interface to assist an application team in developing a project application. For example, the requirements component 112 outputs the two security requirements via the user interface 110 to assist the application team in developing the back end project application.

In box 310, a security test associated with at least one of set of security requirements is optionally identified. For example, the requirements component 112 identifies a security test for testing the two security requirements for the back end project application.

In box 312, identification of a security test is optionally output via a user interface to enable testing of compliance with a set of security requirements. For example, the requirements component 112 outputs identification of the security test for testing the two security requirements for the back end project application via the user interface 110 to enable testing of compliance with the two security requirements.

In box 314, a security test is optionally executed. For example, the requirements component 112 executes the security test for testing the two security requirements for the back end project application In box 316, a result of executing a security test is optionally output via a user interface to report compliance with a set of security requirements. For example, the requirements component 112 outputs the result of executing the security test for testing the two security requirements for the back end project application via the user interface 110 to report compliance with the two security requirements.

Figure 4:
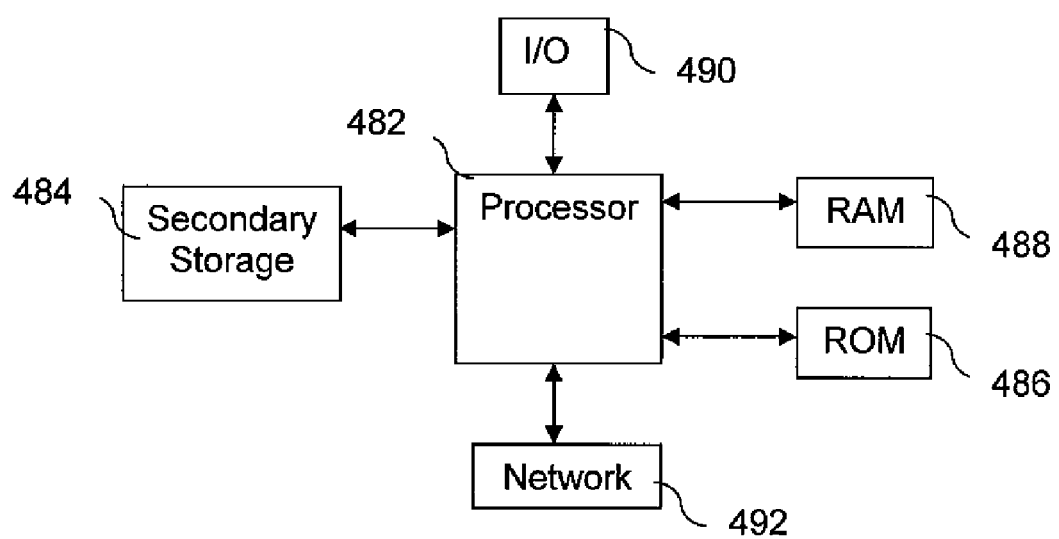
FIG. 4 shows an illustrative computer system suitable for implementing portions of the several embodiments of the present disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, a magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for system level information technology security requirements, comprising:
   a processor;
   a memory;
   a requirements component, stored in the memory, that when executed by the processor,
      outputs three prompts via a user interface, wherein a first prompt of the three prompts comprises a question regarding a type of data associated with a project application and a first set of selectable responses, wherein a second prompt of the three prompts comprises a multiple-choice question regarding different techniques for how the project application authenticates and authorizes users and a second set of selectable responses, and wherein a third prompt of the three prompts comprises a question regarding a processing and storage characterization of the project application and a third set of selectable responses, wherein the second set of selectable responses comprises an enterprise-scale web access management system response, an active domain identification system response, a combination of the enterprise-scale web access management system and the active domain identification system response, and a system without the enterprise-scale web access management system and the active domain identification system response,
      receives selections of at least one of the first set of selectable responses, at least one of the second set of selectable responses, and at least one of the third set of selectable responses via the user interface,
      identifies a set of security requirements for the project application from a larger pool of security requirements based on the selections, and
      outputs the set of security requirements, but not the lamer pool of security requirements, via the user interface to assist an application team in developing the project application.

2. The system of claim 1, wherein the first set of selectable responses comprises a public data response, a restricted customer proprietary network information (CPNI) data response, a restricted government data response, a restricted health insurance portability and accountability act (HIPAA) data response, a restricted payment card industry (PCI) data response, a restricted private identifiable information (PII) data response, and a restricted Sarbanes-Oxley Act of 2002 (SOX) data response.

3. The system of claim 1, wherein the third set of selectable responses comprises a thin client response, a fat client response, and a back end batch processing application response.

4. The system of claim 1, wherein each of the set of security requirements corresponds to a system requirement that specifies an action for the application team.

5. The system of claim 4, wherein the requirements component further outputs a corresponding system requirement via the user interface to assist the application team in developing the project application.

6. The system of claim 5, wherein the requirements component further eliminates duplicate system requirements before outputting a plurality of corresponding system requirements via the user interface to assist the application team in developing the project application.

7. The system of claim 1, wherein the set of security requirements is identified from at least hundreds of security requirements for at least one of the application team, a network team, a corporate security team, a firewall team, and a system administration team.

8. The system of claim 1, wherein the requirements component identifies at least one of the set of security requirements for the project application based on combining at least two of the selections.

9. The system of claim 1, wherein the set of security requirements is designed to protect data when the data is at least one of stored and in transit from at least one of corruption and theft.

10. The system of claim 1, wherein the requirements component further outputs a fourth prompt via the user interface that comprises a question regarding an identity of those who handle data classified as restricted that is associated with the project application and a fourth set of selectable responses in response to a selection of a selectable response other than a public data response from the first set of selectable responses.

11. The system of claim 10, wherein the fourth set of selectable responses comprises responses associated with at least one of enterprise employees, contractors, citizens, non-citizens, and offshore workers.

12. The system of claim 10, wherein the requirements component further modifies implementation of the set of security requirements for the project application based on a selection in response to the question regarding the identity of those who handle data classified as restricted that is associated with the project application.

13. The system of claim 1, wherein the requirements component further outputs a fourth prompt via the user interface that comprises a question whether the project application performs at least one of sending and receiving data classified as restricted outside an enterprise network and a fourth set of selectable responses in response to a selection of a selectable response other than a public data response from the first set of selectable responses.

14. The system of claim 13, wherein the fourth set of selectable responses comprises responses associated with at least one of sending data outside the enterprise network, receiving data from outside the enterprise network, both sending data outside the enterprise network and receiving data from outside the enterprise network, and sending data only inside the enterprise network and receiving data only from inside the enterprise network.

15. The system of claim 13, wherein the requirements component further modifies implementation of the set of security requirements for the project application based on a selection in response to the question whether the project application at least one of sends and receives data classified as restricted outside the enterprise network.

16. A computer implemented method for system level information technology security requirements, comprising:
    outputting, by a requirements component stored in a memory and executed by a processor, three prompts via a user interface, wherein a first prompt of the three prompts comprises a question regarding a type of data associated with a project application and a first set of selectable responses, wherein a second prompt of the three prompts comprises a question regarding how the project application authenticates and authorizes users and a second set of selectable responses, and wherein a third prompt of the three prompts comprises a multiple-choice question regarding different techniques for how processing and storage of the project application is characterized and a third set of selectable responses, wherein the third set of selectable responses comprise a thin client response, a fat client response, and a back end batch processing application response,
    receiving, by the requirements component, selections of at least one of the first set of selectable responses, at least one of the second set of selectable responses, and at least one of the third set of selectable responses via the user interface,
    identifying, by the requirements component, a set of security requirements for the project application from a larger pool of security requirements based on the selections,
    outputting, by the requirements component, the set of security requirements, but not the larger pool of security requirements, via the user interface to assist an application team in developing the project application,
    identifying, by the requirements component, a security test associated with at least one of the set of security requirements, and
    outputting, by the requirements component, the identification of the security test via the user interface to enable testing of compliance with the set of security requirements.

17. The computer implemented method of claim 16, further comprising:
    executing, by the requirements component, the security test; and
    outputting, by the requirements component, a result of executing the security test via the user interface to report compliance with the set of security requirements.

18. The computer implemented method of claim 16, wherein the second set of selectable responses comprises an enterprise-scale web access management system response, an active domain identification system response, a combination of the enterprise-scale web access management system and the active domain identification system response, and a system without the enterprise-scale web access management system and the active domain identification system response.

19. A system for system level information technology security requirements, comprising:
    a processor;
    a memory;
    a requirements component, stored in the memory, that when executed by the processor,
        outputs three prompts via a user interface for each of a plurality of project applications, wherein a first prompt of the three prompts comprises a question regarding a type of data associated with a corresponding project application and a first set of selectable responses, wherein a second prompt of the three prompts comprises a question regarding how the corresponding project application authenticates and authorizes users and a second set of selectable responses, and wherein a third prompt of the three prompts comprises a question regarding a processing and storage characterization of the corresponding project application and a third set of selectable responses, wherein the first set of selectable responses comprise a public data response, a restricted customer proprietary network information (CPNI) data response, a restricted government data response, a restricted health insurance portability and accountability act (HIPAA) data response, a restricted payment card industry (PCI) data response, a restricted private identifiable information (PII) data response, and a restricted Sarbanes-Oxley Act of 2002 (SOX) data response,
        receives selections of at least one of the first set of selectable responses, at least one of the second set of selectable responses, and at least one of the third set of selectable responses for each of the plurality of project applications, wherein when the public data response is selected from the first set of selectable responses, a fourth prompt and a fifth prompt with selectable responses are omitted from being presented via the user interface,
        identifies a corresponding set of security requirements from a larger pool of security requirements for each of the plurality of project applications based on the selections,
        stores the corresponding set of security requirements for each of the plurality of project applications in a database,
        outputs the corresponding set of security requirements, but not the larger pool of security requirements, via the user interface to assist a corresponding application team in developing each of the plurality of project applications, receives an audit request via the user interface that causes the requirements component to identify, a set of project applications based on the audit request, to identify a corresponding set of security requirements in the database for each of the identified set of project applications, and to output information associated with the corresponding set of security requirements for each of the identified set of project applications, wherein the information comprises the corresponding set of security requirements for each of the identified set of project applications.

20. The system of claim 19, wherein the information further comprises information associated with at least one security test executed for each of the identified set of project applications and a corresponding result associated with executing each security test.

* * * * *